UNITED STATES PATENT OFFICE.

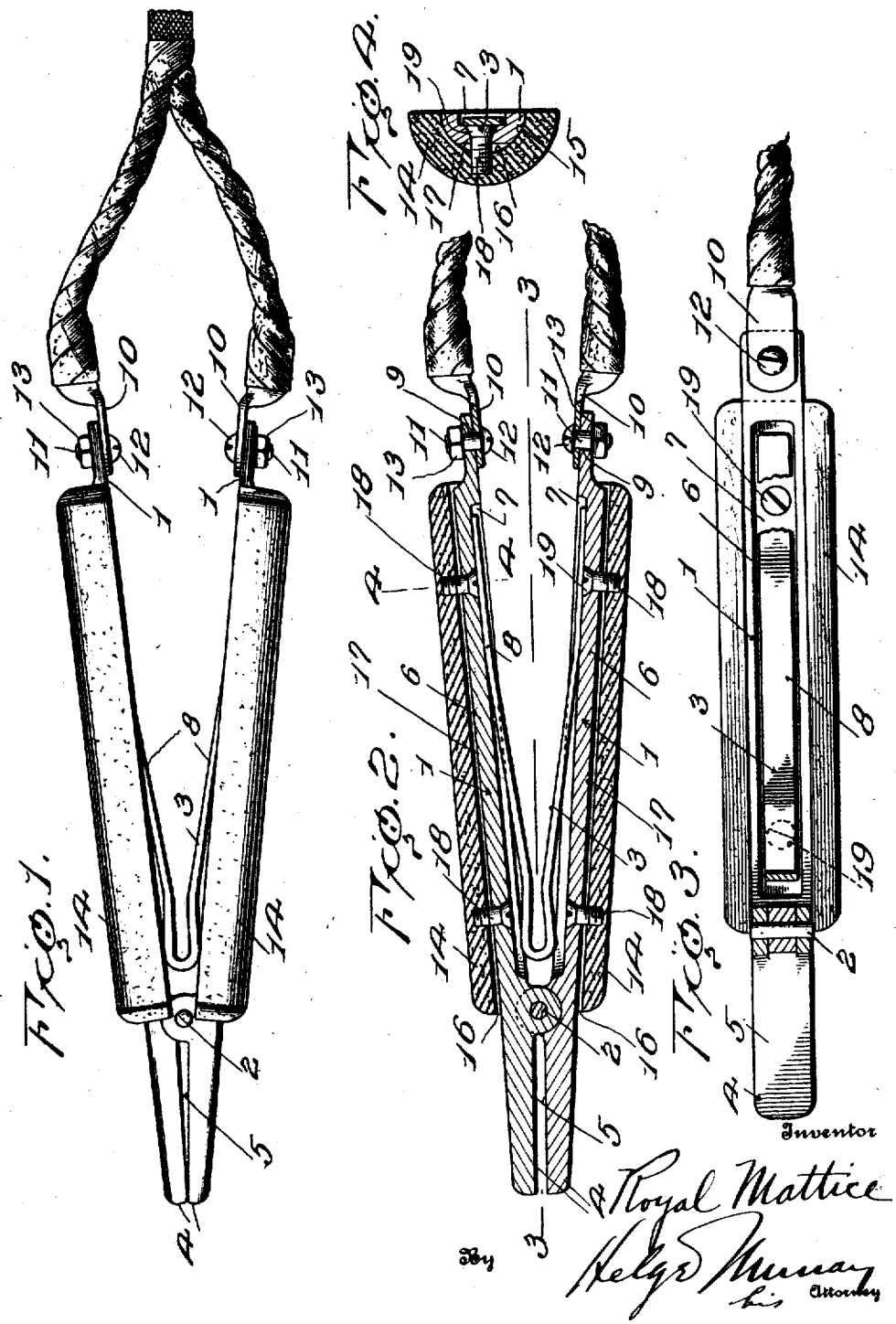

ROYAL MATTICE, OF PHILADELPHIA, PENNSYLVANIA.

WELDING TOOL.

1,419,744. Specification of Letters Patent. Patented June 13, 1922.

Application filed March 24, 1922. Serial No. 546,419.

*To all whom it may concern:*

Be it known that I, ROYAL MATTICE, a citizen of the United States, residing at Philadelphia, in the county of Philadelphia and State of Pennsylvania, have invented certain new and useful Improvements in Welding Tools, of which the following is a specification.

My invention relates to welding tools adapted to be used in connection with electric arc welding, and contemplates more particularly the production of a safe, efficient and durable tool in which the possibility of shock and excessive heating is reduced to a minimum, and the rapidity of conducting the electric current to the electrode is materially increased.

The invention has for an object to provide a welding device for gripping and holding an electrode, said device including a handle grip of heat and electrical insulating material attached to the current conducting member by means connecting the said handle grip from the under or inside thereof, said means terminating short of the exterior or outer faces of said grip, about which the hand of the operator is positioned, thereby preventing the possibility of shock.

Another object of the present invention is to provide a welding device including in combination a tool formed of copper for conducting the electrical current and holding the electrode, a hand grip of heat and electrical insulating material for said tool, and means for detachably connecting an electric conductor to said tool.

A further object of my invention is to provide a reliable welder's tool capable of continuous use without overheating said tool comprising a metal bar of good electric conductivity, such as copper for example, a handle grip of heat and electrical insulating material attached to said metal bar, between which and said bar is provided a relatively large air space, said air space being located longitudinally and centrally of the tool and adjacent that portion of the handle grip principally covered by a workman's hand when operating the tool, thereby materially preventing the transmitting of any appreciable amount of heat to the hand. The use of metal possessing very good as distinguished from fair electric conductivity when used with an air space arranged immediately adjacent the portion of the hand grip principally covered by an operator's hand, has been found in practice to be very effective and acceptable to the trade.

A still further object of the invention consists in the production of a pair of welding tongs, the jaw faces gripping and holding the electrode being smooth and unmutilated, and the shank of each tong member having a detachable connection for the electric conductor, said connection being of simple and durable construction and capable of easy and rapid manipulation when attaching or detaching said conductor.

With these and other objects in view the invention further consists in the construction and arrangement of the several parts hereinafter described and pointed out in the claims.

In the drawings chosen for purposes of illustrating my invention, and wherein similar reference characters designate corresponding parts in the several views:—

Fig. 1 is a view of my improved welding tool in side elevation, the split ends of an electrical conductor being shown connected thereto;

Fig. 2 is a vertical longitudinal sectional view, the respective members of said tool being slightly compressed with the jaw faces arranged substantially parallel for the reception of an electrode;

Fig. 3 is a horizontal longitudinal sectional view on the line 3—3 of Fig. 2; and Fig. 4 is an enlarged detail transverse sectional view on the line 4—4 of Fig. 2.

Generally stated, my improved welding tool which grips the electrode and through which the electric current is conducted, includes a handle portion provided with a heat and electrical insulating grip, an electrode holding device at one end thereof, and means for easily and rapidly attaching an electrical conductor to the other end of said tool. In the present embodiment of my invention I have constructed the tool in the form of a pair of tongs consisting of two current conducting members 1—1, pivotally connected by the pin 2 and operably controlled by means of the spring 3 arranged and adapted to normally move the jaws 4 of the tool toward each other in gripping the electrode inserted therebetween. The current conducting members are of relatively tough and durable metal capable of withstanding the welding heat and are also good conductors of the electric current, said members being preferably formed of copper and offering little resistance to the flow of the current therethrough. I have found that a durable metal current conducting member constructed principally of copper gives the best results in rapidly and effectively transmitting the current to the electrode.

Each current conducting member 1 comprises a jaw portion, the gripping face of which is smooth and unmutilated as indicated at 5, and a shank portion 6 provided in the under or inner face thereof with the longitudinally and centrally located groove 7, into which the arm 8 of the spring 3 is fitted. The end of the shank 6 is slightly reduced as shown and is provided with an opening 9 through which and the metal end 10 of the current conductor, passes the bolt 11. The bolt 11 is of usual construction being provided with a head portion 12, and a nut 13 is fastened on the threaded end of said bolt as shown. A detachable connection of the construction described has been found to materially increase the effectiveness of the tool, the long delays incident to the breaking of permanently attached conductors being obviated. In addition, the connection or attachment can be easily made and with a rapidity commensurate with the speed incident to electric welding. The conductor is split as shown, the respective split ends thereof being connected to the ends of the tong members as will be readily understood.

The current conducting members of the tool are each provided with a hand grip 14, said grip being formed of a heat and electrical insulating material. As shown the hand grips 14 are adapted to substantially surround the current conducting members 1, that is the portions of said members 1 which would be exposed to possible contact during the use of the tool. The interior faces of the grips 14 contact with the outer face of the current conducting member 1 as shown at 15. These contacting faces are curved as clearly shown in Fig. 4, the air space indicated by the numeral 16 however interrupting these contacting portions.

The air space 16 is formed between the inner face of the material constituting the hand grip, and a longitudinal flattened portion 17 of the current conducting member 1. This air space is located intermediate the hand grip 14 and the current conducting member and at points principally covered by the hand of the operator when grasping the tool. As shown, the air space is relatively large and located longitudinally and centrally of the hand grip and provides an effective means for preventing the conducting of the welding heat to the hand of the operator.

The means for attaching the hand grips 14 to the metal current conducting members 1 comprises screws 18 adapted to be inserted from the under or inside of said members, the said screws as shown having heads 19 countersunk within the members 1 and having their threaded shanks extending into the handle grips but terminating short of the outer faces thereof. The specific screws shown, when inserted from the inside of the handles, have been found to give satisfactory results and prevent shocks being transmitted through the handles to the hand of the operator. I do not wish to be limited however to the exact form of connecting devices illustrated, as my invention resides in attaching the handle grips to the current conducting member from the inside or underside thereof, as distinguished from screws, pins or other devices connecting the handle grips by inserting the screws or pins, etc., through the outer faces of the hand grips over which the hand of the operator extends when grasping the tool. In tools of this type heretofore constructed, insulating material or plugs have been placed above the countersunk head of the screw inserted from the outside of the hand grips, but these in practice soon work loose and the heads of the screws are exposed resulting in shocks to the operator.

A welding tool constructed in accordance with my present invention assures an operator of little if any danger from shock by reason of the connecting means extending from the inside of the handle, and together with the detachable connection at the end of the current conducting members provides for a most rapid and easy manipulation of the tool under conditions actually experienced in welding operations. The utilization of smooth jaws for gripping the electrode member has also been found to be advantageous, it being apparent that the electrode can be positioned at any angle between the jaws and at the same time receive a maximum flow of the electric current. A greater range therefore of angular adaptability in the use of the tool and the gripped electrode held therein can be obtained.

Such changes as fall within the scope of my invention may be made, and I do not wish the terms and description thereof to be taken in a limited sense, but define my invention as follows:

I claim:

1. A welding tool of the class described comprising a pair of tongs having handle portions and clamping jaws, said jaws being adapted to grip an electrode, heat and electrical insulating handle grips, said grips being attached to the handle portions of the tongs from the inside thereof, and means for detachably connecting an electric conductor to said tongs.

2. Welding tongs of the class described including a pair of current conducting members, each of said members being provided with a handle portion formed with a groove on one side thereof, and an electrode gripping jaw having a smooth face on the same side of said handle, means including a spring having the arms thereof extending in said groove in each member for normally forcing said smooth faces of the jaw toward each other, handle grips of heat and insulating material for the handle portions of said current conducting members, means for securing said grips to said handle portions, said means being inserted from the under or inside of said handle portions, and an electric conductor detachably connected to the handle portions of said current conducting members.

3. A welding tool comprising a pair of copper tongs adapted to conduct an electric current to an electrode, heat and electrical insulating handle grips for said tongs, means connecting said grips to the tongs from the inside thereof, said means terminating short of the outer faces thereof, and means detachably connecting an electric conductor to said tongs.

4. In a welding tool for holding an electrode in electric arc welding, the combination with a copper current conducting member, of a hand grip therefor, said grip being formed of heat and electrical insulating material, means terminating short of the exterior faces of said grips for connecting the same to said member, said means including a screw insertible from the inside or under side of the member, and an electric conductor connected to said member.

5. In a tool for electric arc welding, the combination with a current conducting member composed of copper and adapted to hold an electrode, of a hand grip of heat and electrical insulating material, means for connecting said material to said member, and means for detachably connecting an electric conductor to said copper member.

6. In a welding tool of the class described, a copper electrode holder, a heat and electrical insulating handle attached to said holder, and a current conductor connected to the said electrode holder.

7. In a welding tool of the class described, a copper electrode holder, a handle grip for said holder of heat and electrical insulating material, said handle grip having a portion thereof spaced from the copper electrode at a point principally gripped by the hand, and means for connecting an electric conductor to said holder.

8. In a welding tool of the class described, a pair of copper tongs having jaws for clamping an electrode, handle grips for said tongs, said grips comprising heat and electrical insulating material adapted to be connected to said tongs in spaced relation therefrom at points principally covered by the hand when using said tongs, and a current conductor detachably connected to said tongs.

9. A welding tool of the class described comprising a copper electrode holder having a smooth holding surface for an electrode, and a shank, a handle grip of heat and electrical insulating material covering said shank and spaced therefrom so as to form a relatively large air space between said grip and the shank at the major portions of the tool gripped by the hand, and a current conductor detachably connected to said shank.

10. A welding tool for electric arc welding comprising an electrode holder, a hand grip of heat and electrical insulating material adapted to be connected to said holder in spaced relation therefrom for forming an air space centrally and longitudinally of said hand grip.

11. A welding tool of the class described comprising an electrode holding device, a handle grip of heat and electrical insulating material, means for attaching said handle grip to the holding device, said means comprising a screw inserted through the holding device and extending into said handle grip and terminating short of the outer hand engaging surface thereof, and a current conductor connected to said holding device.

12. A welding tool of the class described comprising an electrode holding device provided with a handle, a handle grip of heat and electrical insulating material, means for attaching said handle grip to the holding device, said means being inserted from the inside of said handle, and means for detachably connecting an electric conductor to said holding device, whereby the conductor can be easily and rapidly attached and detached from said holding device.

13. An electric arc welding tool having an electrode holding device at one end, a handle grip of heat and electrical insulating material secured to said tool from the inside or underside thereof, and a detachable connection at the other end of said tool for easily and rapidly connecting and detaching an electric conductor to the tool.

14. An electric arc welding tongs provided with hand grips formed of heat and electrical insulating material, said hand grips being connected from the inside of the handles and spaced therefrom at points principally covered by the hand when using the tongs.

15. A device for gripping and holding electrodes for electric arc welding including in combination a handle element comprising a bar of copper, a handle grip of heat and electrically insulating material mounted on the same, means for detachably attaching an electric conductor to one end of the bar of electrically conducting material, and a gripping jaw having substantially smooth gripping surfaces.

16. In an electrode holder for electric welding in combination a pair of copper tongs, clamping jaws for the electrode having substantially smooth clamping surfaces, handle grips for the tongs of heat and electrical insulating material, said grips being attached to the handles from the inside of the handle, and means comprising a bolt extending through the end of the tongs for detachably connecting an electric conductor to the tongs.

In testimony whereof I affix my signature.

ROYAL MATTICE.